No. 720,547. PATENTED FEB. 10, 1903.
L. F. FUCHS & B. K. FISHER.
SHEET SEPARATING AND FEEDING MECHANISM FOR PRINTING OR OTHER MACHINES.
APPLICATION FILED MAR. 19, 1901.
NO MODEL. 10 SHEETS—SHEET 1.

Fig. 1.

Witnesses
C. H. Walker
George A. Bentley, Jr.

Inventors
L. F. Fuchs and
B. K. Fisher,
by John T. Harris
Attorney

No. 720,547. PATENTED FEB. 10, 1903.
L. F. FUCHS & B. K. FISHER.
SHEET SEPARATING AND FEEDING MECHANISM FOR PRINTING OR OTHER MACHINES.
APPLICATION FILED MAR. 19, 1901.
NO MODEL. 10 SHEETS—SHEET 2.

No. 720,547. PATENTED FEB. 10, 1903.
L. F. FUCHS & B. K. FISHER.
SHEET SEPARATING AND FEEDING MECHANISM FOR PRINTING OR OTHER MACHINES.
APPLICATION FILED MAR. 19, 1901.
NO MODEL. 10 SHEETS—SHEET 4.

Witnesses
C. H. Walker
George A. Bentley, Jr.

Inventors
L. F. Fuchs and B. K. Fisher
by John T. Harris
Attorney

No. 720,547. PATENTED FEB. 10, 1903.
L. F. FUCHS & B. K. FISHER.
SHEET SEPARATING AND FEEDING MECHANISM FOR PRINTING OR OTHER MACHINES.
APPLICATION FILED MAR. 19, 1901.
NO MODEL. 10 SHEETS—SHEET 9.

Fig. 16.

Witnesses
C. H. Walker
George A. Bentley, Jr.

Inventors
L. F. Fuchs
and B. K. Fisher
by John T. Harris
Attorney

No. 720,547. PATENTED FEB. 10, 1903.
L. F. FUCHS & B. K. FISHER.
SHEET SEPARATING AND FEEDING MECHANISM FOR PRINTING OR OTHER MACHINES.
APPLICATION FILED MAR. 19, 1901.
NO MODEL. 10 SHEETS—SHEET 10.

UNITED STATES PATENT OFFICE.

LOUIS F. FUCHS AND BENJAMIN K. FISHER, OF ST. LOUIS, MISSOURI.

SHEET SEPARATING AND FEEDING MECHANISM FOR PRINTING OR OTHER MACHINES.

SPECIFICATION forming part of Letters Patent No. 720,547, dated February 10, 1903.

Application filed March 19, 1901. Serial No. 51,850. (No model.)

*To all whom it may concern:*

Be it known that we, LOUIS F. FUCHS and BENJAMIN K. FISHER, citizens of the United States, residing at St. Louis, in the State of Missouri, have invented certain new and useful Improvements in Sheet-Separating Mechanism, of which the following is a specification, reference being had therein to the accompanying drawings.

This invention is an improvement on the machine shown in an application for patent now pending, Serial No. 732,249, filed September 30, 1899. While the present machine is constructed in some respects on the same principles as the prior machine, the various mechanisms are in detail much improved.

The present invention relates to a machine for feeding paper to a printing-press or other machine requiring that the sheets be presented to it one by one.

In the following description and the accompanying drawings is disclosed the preferred embodiment of our invention, while the scope thereof is pointed out in the annexed claims.

In the drawings, Figs. 2 and 3 show the separating and feeding devices at the two extremes of their respective movements.

A suitable framework affords support for the several groups of mechanisms, which mechanisms are indicated generally as the magazine A, the sheet-separating devices B, (shown in detail in Figs. 6, 7, 8, 9, and 10,) the feeding devices C, hereinafter designated as the "pushers," (shown in detail in Figs. 11 and 12,) the mechanism D for automatically adjusting the height of the magazine, (shown in detail in Figs. 16, 17, and 18,) and the reciprocating frame E (shown in detail in Fig. 5) which carries the feeding devices F, hereinafter designated as "pullers" to distinguish them from those feeding devices C which push the sheet being fed. This frame also carries a series of cams $a$ $b$ $c$ $d$ $e$, which are arranged to actuate certain parts of the separating and feeding mechanisms, as will be explained in connection with said mechanisms. These cams may be seen in Figs. 2, 3, 8, 11, 12, 17, and 18.

In the several figures may be seen the magazine A for supporting and presenting the pile of paper in position to be operated upon by the separating and feeding devices.

Figure 1:
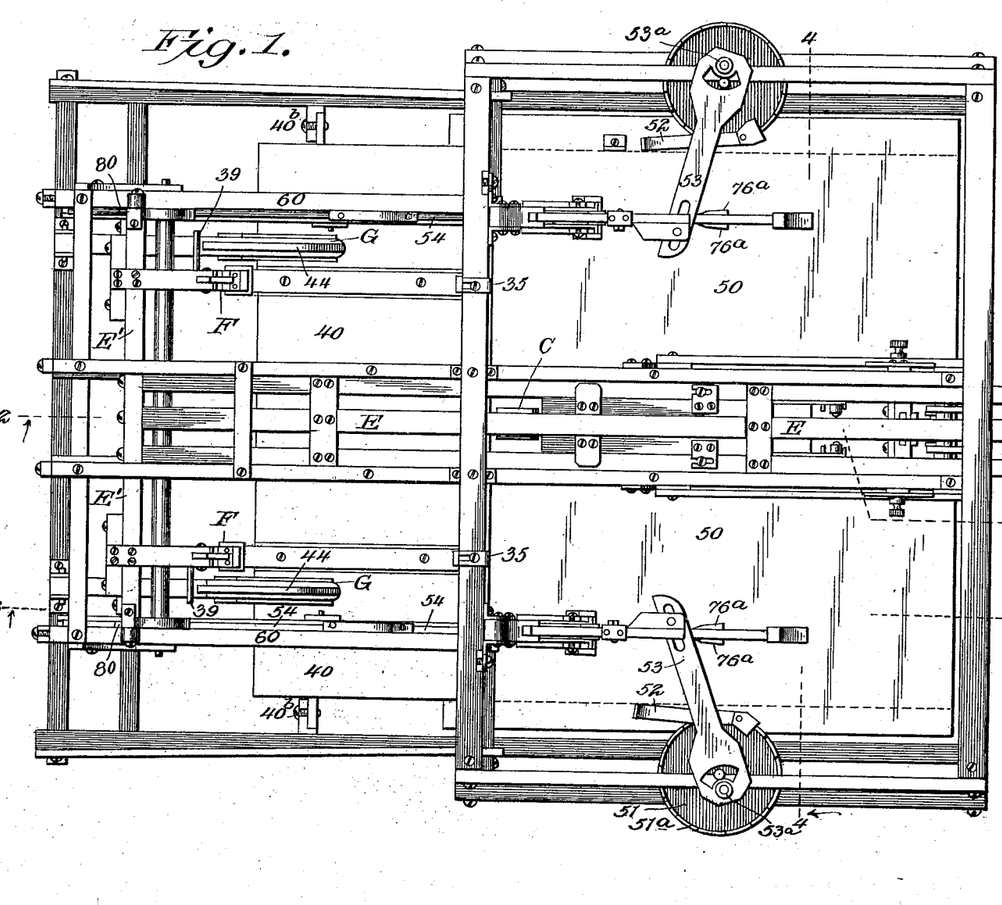
Figure 1 represents a plan view of the separating and feeding mechanism, hereinafter described.
Figure 2:
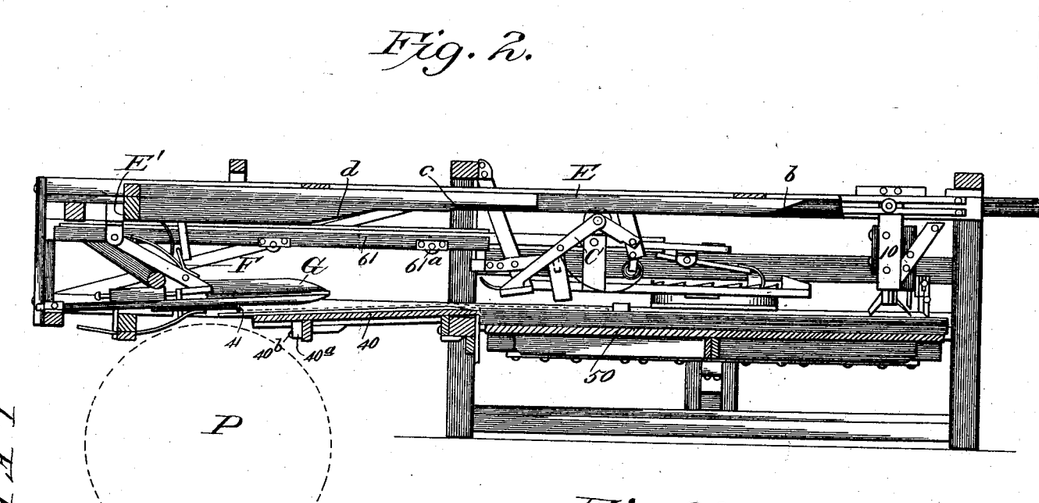
Fig. 2 is a view in section on line 2 2 of Fig. 1 looking in the direction of the arrow thereon.
Figure 3:
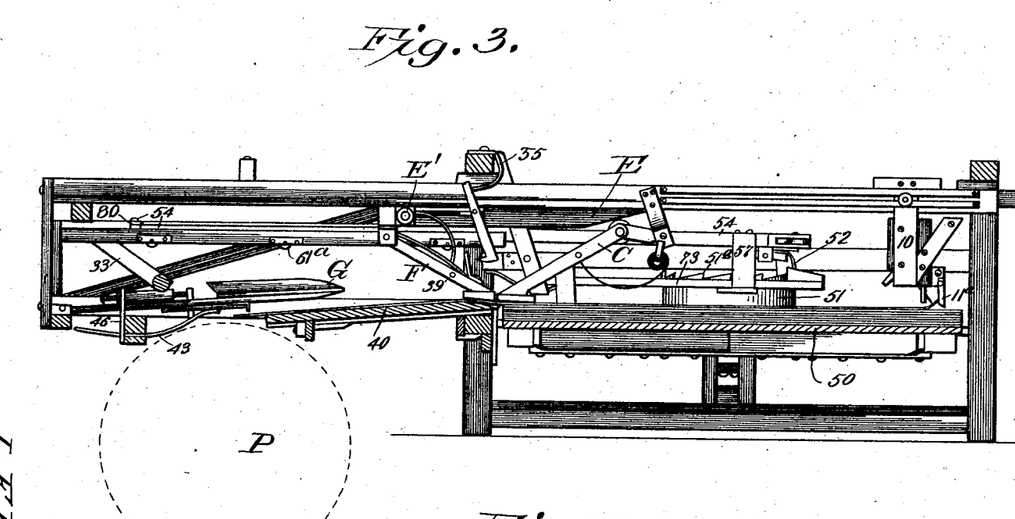
Fig. 3 is a view in section on line 3 3 of Fig. 1 looking in the direction of the arrow thereon.
Figure 6:
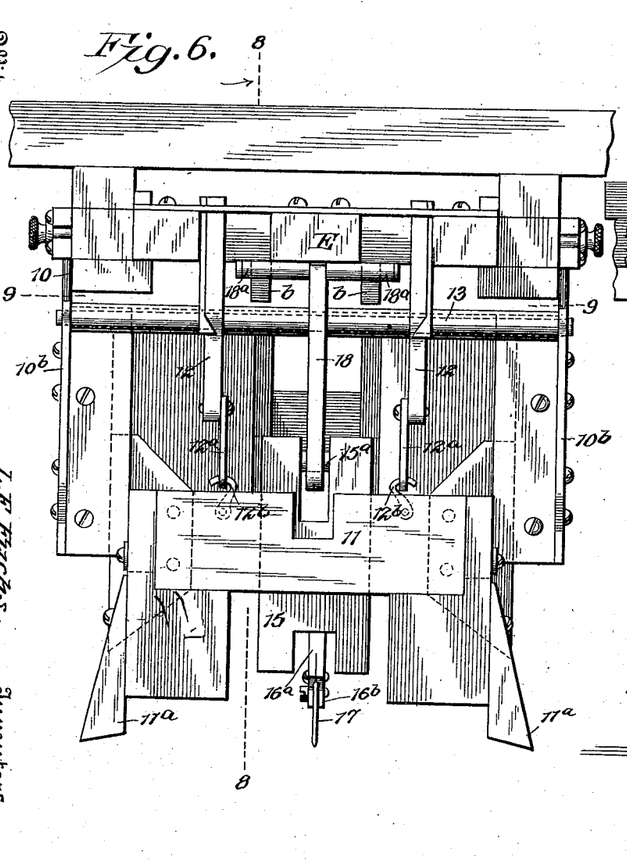
Fig. 6 is a rear end elevation showing the separating-needle and the detainers, which normally rest on the pile of paper, the framework being broken away at either side of this figure to economize space.
Figure 7:
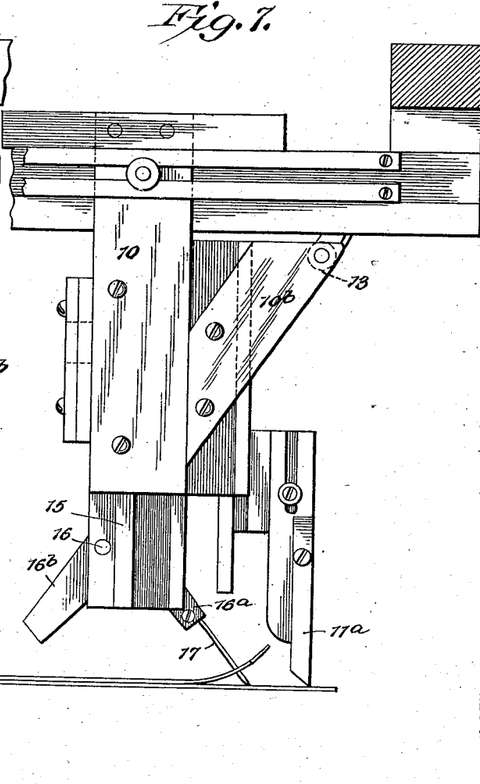
Fig. 7 is a side elevation of that portion of the machine shown in Fig. 6, disclosing the top sheet engaged upon the separating-needle by a slight withdrawal of the top sheet from the second sheet, which is held from movement by the detainers.
Figures 8, 9:
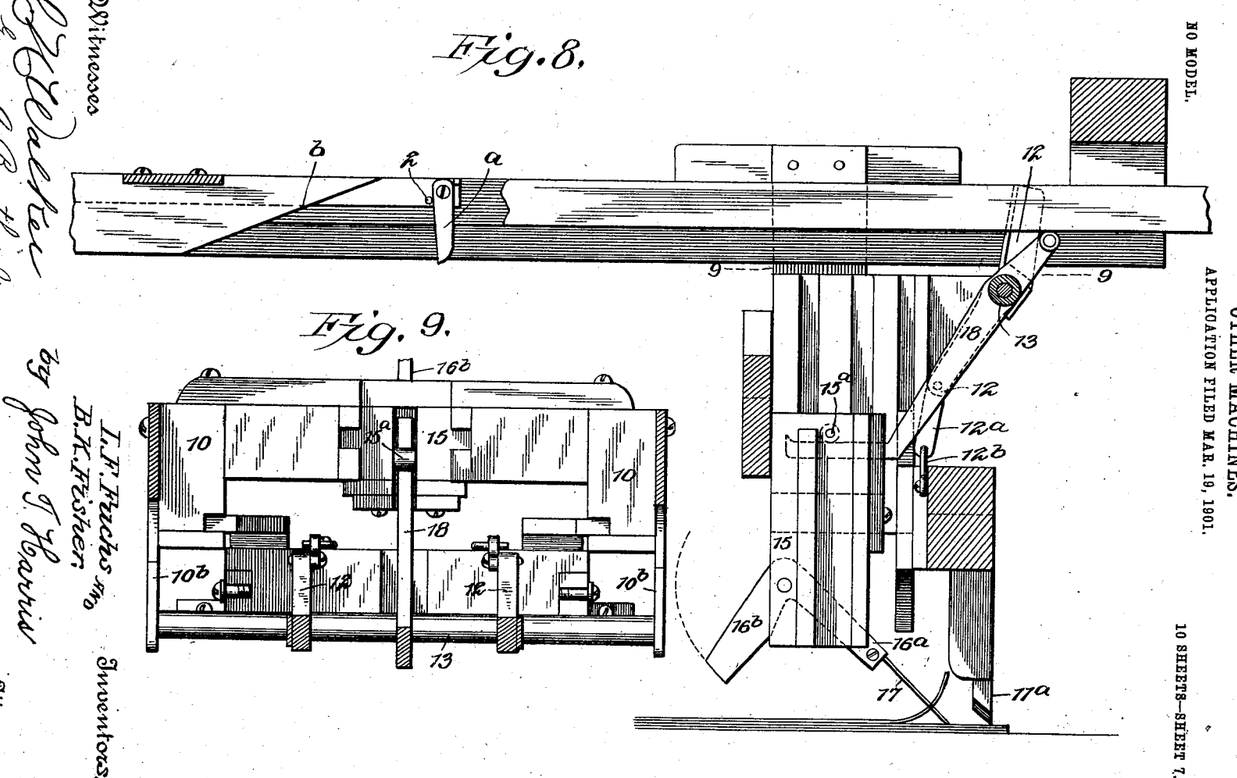
Fig. 8 is a side view of the separating mechanism shown in Figs. 6 and 7, the same being seen from line 8 8 of Fig. 6.
Fig. 9 is a top plan view of the said separating mechanism as seen from line 9 9, Fig. 8.
Figure 10:
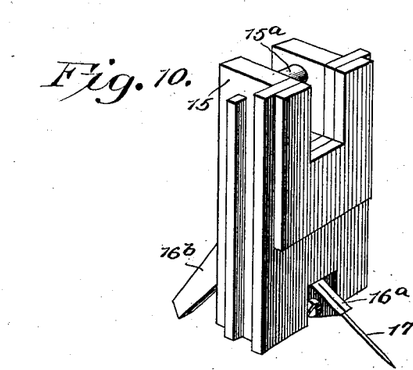
Fig. 10 is a perspective view of the separating-needle carrier with the needle in place therein.

The separating mechanism (designated, broadly, by the reference-letter B) is to be seen in Figs. 2, 3, 6, 7, 8, 9. It comprises guide-plates 10, suspended from the upper portion of the frame near the rear end thereof, which is the right-hand end of the machine as seen in Figs. 1, 2, and 3. These guide-plates are located above and near the rear end of the magazine A. Arranged for vertical movement in said guide-plates is a block 11, (see Fig. 6,) having bearing-surfaces $11^a$, arranged to rest upon the upper surface of the pile of paper adjacent the rear edge thereof. These bearing-surfaces are preferably two in number and so located as to engage the top of the pile of paper at opposite sides of the point of engagement therewith of the separating-needle, later to be described. These surfaces bearing on the pile prevent the displacement of the sheet with which they are in engagement and will therefore be referred to as "detainers." Preferably these detainers will be made adjustable in vertical extent, as shown. This permits of the extent of the movement of said detainers by their operating means, next to be described, to be varied. The block 11 is arranged to be raised from the paper at certain periods by means of levers 12, fulcrumed on some fixed part of the frame, as upon the rod 13, which is journaled between the branches $10^b$ of the guide-plates 10. These levers are flexibly connected to the block, as by the links $12^a$ $12^b$, and their upper ends extend into the path of the cam projections $a$ on the reciprocating frame E. These cam projections are conveniently in the form of depending arms $a$, free to swing in one direction, as toward the rear of the machine, and prevented from swinging toward the front by suitable stops or shoulders, as 2 in Fig. 8. By this form of cam projection the levers are momentarily depressed by the cams $a$ when the reciprocating frame travels toward the rear, but are unmolested when said frame travels in the opposite direction, as will be clear from Fig. 8. There are two of the levers 12, as may be seen from Fig. 6, and there are of course two of the cams $a$ arranged on the sides of the frame E and so located that their respective paths of movement will bring one against each of the levers 12 at the proper time to actuate the same. It is of course to be understood that any other suitable means may be employed for momentarily raising the detainers from the paper; but the one shown has proven very satisfactory. There is also mounted in the guide-plates 10 for vertical movement, similar to the movement of the block 11, another block, (indicated by 15.) This block is somewhat in advance of the block 11 and the detainer $11^a$ and at its lower end is suitably recessed to receive a rock-shaft 16. Secured to this rock-shaft is an arm $16^a$, arranged to carry a needle-like instrument 17, having a point and a slender shank. This needle may be secured to the arm in any suitable way, as by slitting the end of the arm and clamping the needle between the slitted portions in any adjustable manner by a clamping-screw, as shown in Figs. 6 and 7. A weight, which may conveniently be, as shown, in the form of an arm $16^b$, is also attached to the rock-shaft. The arrangement of these parts is such that the arm $16^a$ and the needle normally point downwardly and rearwardly under the influence of gravity on said arm and said weight. These arms $16^a$ and $16^b$ may conveniently be constructed, as shown, like an elbow-lever, fulcrumed at the angle. A pin fixed in the block 15 and forming a journal for the said arms may obviously be substituted for the rock-shaft 16. The essential feature is that the needle-arm and needle shall be free to swing in a vertical plane and when the parts are acted upon by gravity alone shall point downwardly and rearwardly in such a manner as to engage the paper obliquely and that the weight $16^b$ shall be capable of returning the arm $16^a$ to said normal position when displaced therefrom. It is obvious that the specific means for mounting the needle may be varied and that a spring or other means may be substituted for the weight for accomplishing the same purpose.

Means is provided for raising the block 15 in the guide-plates 10. As shown, this means comprises an elbow-lever 18, fulcrumed near the free end of one of its arms on the rod 13, heretofore mentioned. The other arm of the lever engages, through a suitable recess through the block 15, a stud or pin $15^a$ on said block. The upper free end of this lever 18 stands in a position to be engaged by a cam projection $b$ upon the reciprocating frame E. As shown and for the purpose of greater steadiness in operation, this cam is constituted of two inclines offset laterally from the median line of the reciprocating frame E, and the upper end of the lever 18 is extended laterally upon either side, as at $18^a$, to lie in the path of said inclines, all as shown most clearly in Fig. 6. The extensions $18^a$ may conveniently be formed by an antifriction-roller journaled in the said end of the lever 18. This arrangement provides an extended bearing of the cam $b$ upon the lever 18, which is effectual in preventing the lever 18 from canting laterally and binding. It will be observed that the cam $b$ is farther than the cam $a$ from the rear or right-hand end of the reciprocating frame and that as said frame moves toward the right in its reciprocations the cam $b$ will engage the lever 18 to depress the same, and thereby raise the needle-block 15 and needle 17 immediately after the cam $a$ has engaged the lever 12 and raised the detainer-block 11.

Figure 11:
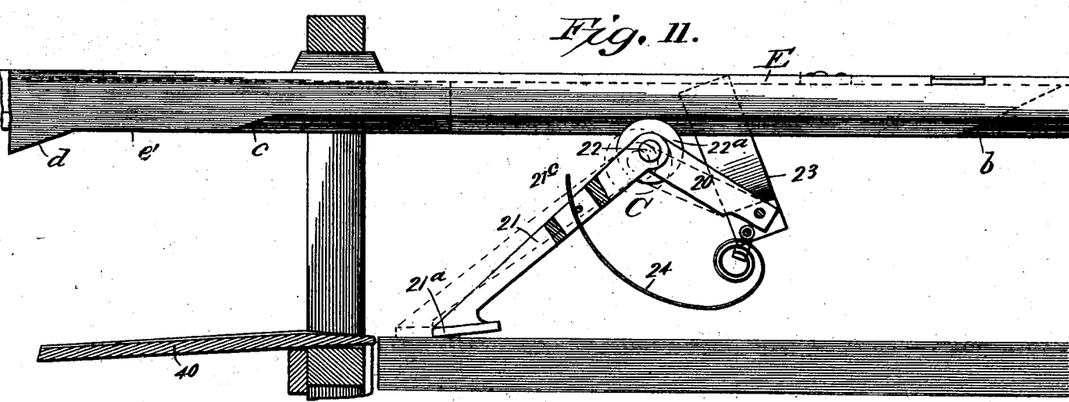
Fig. 11 is a detail view, on a large scale, of the pushers, which operate in conjunction with the separating-needle to segregate the top sheet, said pusher being shown in full and dotted lines in two of the positions which it is caused to assume by the cam-bar, which is also shown.

The framework carries that feeding device which we have termed the "pusher." It is indicated at C in the drawings and comprises the rigid bars 20 21, hinged together at 22. The pusher is supported from some rigid part of the frame. As shown, it is supported by a yoke suspended from that portion of the framework which forms a guideway for the reciprocating frame E, as most clearly shown in Figs. 3, 4, and 11. The pusher is connected to this yoke by a transverse pin, which allows the pusher to swing in a vertical plane. A spring 24 is connected to some fixed part, as to the yoke 23, and extends loosely through a mortise $21^d$ in bar 21 of the pusher in such a manner as to support the pusher normally above the paper and rest very lightly on the top thereof, as shown in Fig. 11, and to tend to flex the bars 20 21 of the pusher upon the joint 22. As shown, the spring is coiled about its point of attachment to the yoke, and its other end is extended through the mortise $21^d$ and bears upward against the antifriction-bar $21^e$ in the bar 21 between its ends. The pusher is preferably provided at its highest point, as at the pivot 22, with an antifriction-roller $22^a$, which is arranged in the path of the reciprocating frame E and is adapted to be engaged by certain cam-surfaces on said frame E. These cam-surfaces are indicated at $c$ and $d$ in Figs. 11 and 12, and, as will be seen, they are separated a slight distance, whereby there is an interval between the actuations caused by them. The bar 21 of the pusher has a foot $21^a$, which provides an extended surface adapted to contact with the upper sheet of paper. This surface may advantageously be padded with rubber or other friction material.

Figure 12:
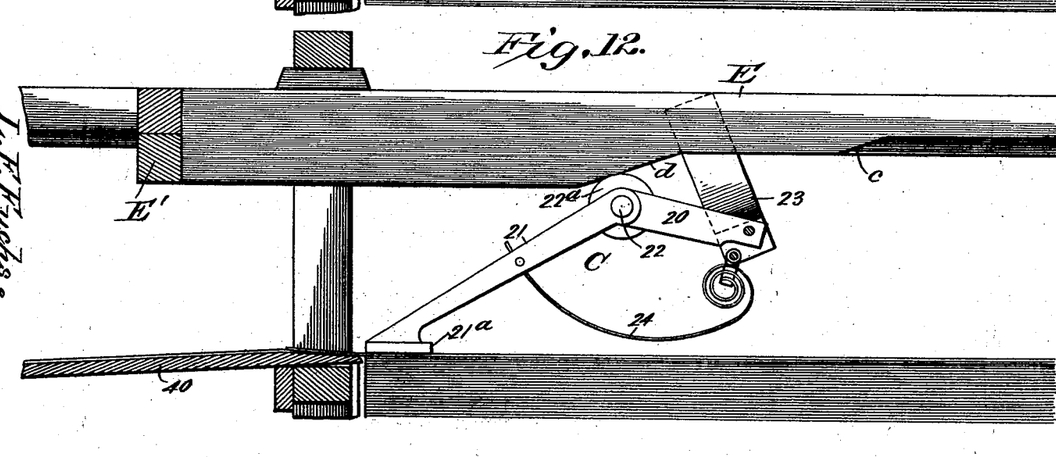
Fig. 12 is a view similar to Fig. 11, the pusher being shown in a third position by reason of the cam-bar being farther to the right than in Fig. 11.
Figure 14:
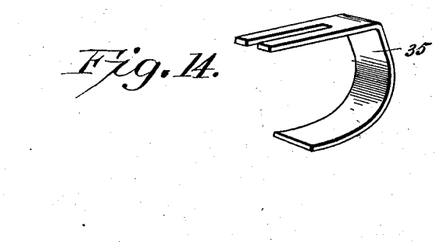
Fig. 14 is a detail view of one of the adjustable trip devices, such as are shown in Fig. 13.

In Fig. 11 the pusher C is shown in full lines in the normal position which it occupies before contact of the cam $c$ with the roller $22^a$. As the reciprocating frame E moves to the right in this figure the cam $c$ will strike the roller $22^a$ and depress the pusher into the position shown in dotted lines in said figure—that is to say, first into a position of firm contact with the top sheet, such that the latter portion of said movement will displace the top sheet sufficiently far to cause it to become perforated by and move up on the shank of the needle 17. In the further movement of the frame E and during the passage of the straight portion $e'$ intermediate the inclines or cams $c$ and $d$ over the roller $22^a$ the pusher remains in the position shown in said dotted lines and the cams $a$ pass off from the levers 12 and allow the detainer, which had been raised thereby, to drop and clamp the rear end of the second sheet onto the pile. The cam $b$ then engages the levers 18 and raises the needle-block into the position shown in Fig. 3. As the needle swings on its pivot the needle-block rises, so as to allow the needle-point to move in the plane of the sheet. As the movement of the frame E continues the cam $d$ engages the roller $22^a$ of the pusher, as shown in Fig. 12. The bars 20 21 of the pusher are compelled to move relative to each other on their pivot 22. The rear end of the bar 20 being secured to the fixed yoke, the bar 21 must alone yield, and its movement is compelled to be outward or upward, as from the position shown in Fig. 11 to that shown in Fig. 12. In this movement the top sheet of paper is by friction carried along with the foot $21^a$ of the pusher and fed to a position approximately such as that which it occupies in Fig. 12, the cam $d$ being therein shown as having nearly completed the movement of the pusher. It will be here noted that the cam $c$ engages the pusher in the manner described immediately before the cam $b$ operates to lift the separator-needle 17 and that therefore the sheet is given a slight movement of withdrawal while the needle is held against it, which results in the sheet becoming impaled on the needle and drawn a short distance upon the shank of the needle. The lifting of the separator-needle takes place immediately after the latter portion of the passage of the incline $c$ over the pusher-roller $22^a$. This sequence of operations will be more fully explained later.

Figure 4:
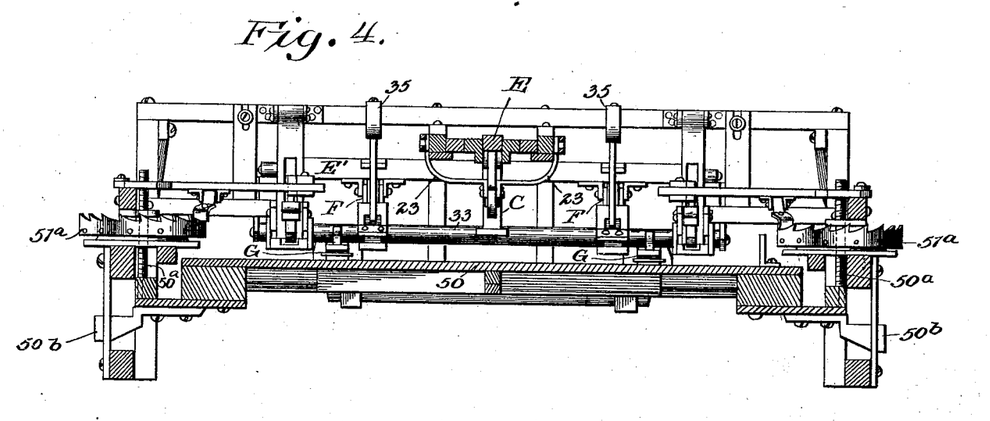
Fig. 4 is a view in section on line 4 4 of Fig. 1 looking in the direction of the arrow thereon.
Figures 5, 13:
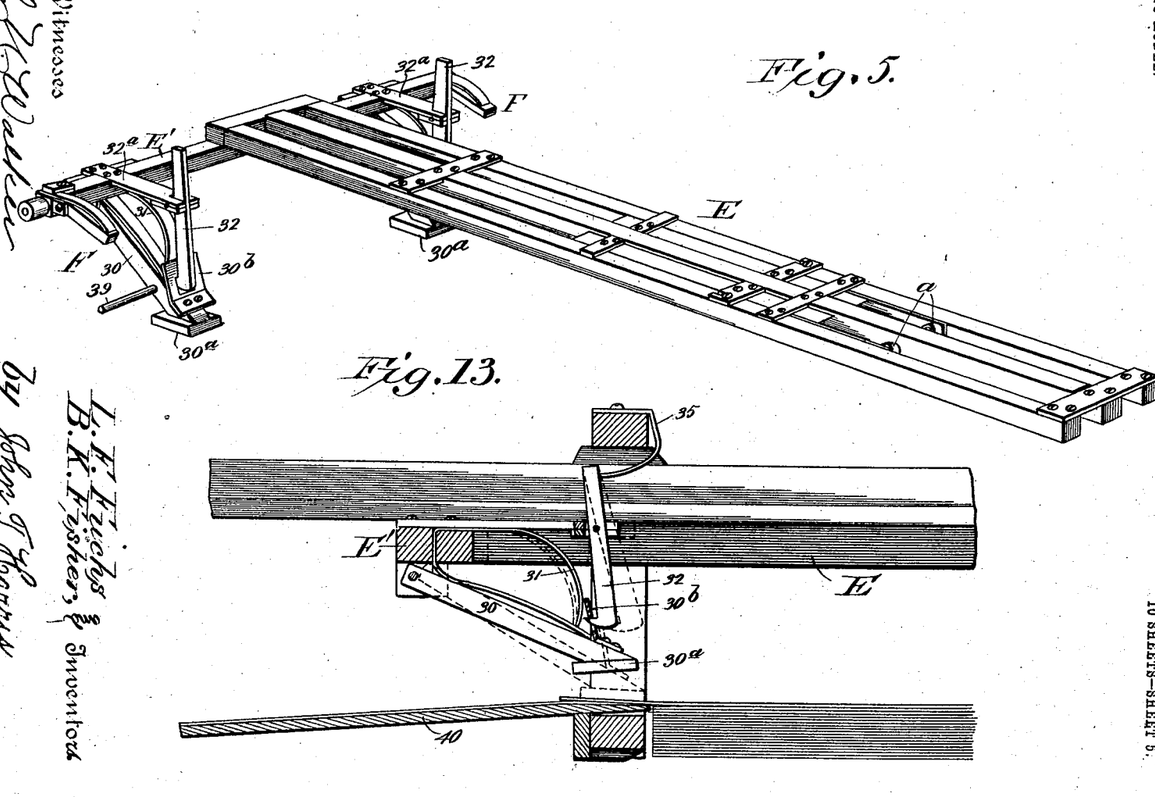
Fig. 5 is a perspective view of the reciprocatory slide-bar and of the parts which are attached to said slide-bar.
Fig. 13 is a detail view of one of the feed devices, hereinafter designated as "pullers," together with certain coacting parts, the same being shown in full lines in the position immediately preceding engagement of the puller with the paper and in dotted lines in the position of engagement.

Those feeding devices which we have termed "pullers" are designated in the drawings by F. (See Figs. 1, 2, 3, 4, 5, and 13.) These pullers are arranged to take the separated or partially-separated sheet from the position to which it has been carried by the pushers, as shown in Figs. 12 and 13, and pull it across the feed-board to the gages, where it may conveniently be engaged by the printing-press mechanism. The pullers are carried by or arranged to move with the frame E in its reciprocations. They are also arranged to have a vertical movement toward and from the feed-board to bring them down upon the sheet, being fed during the forward movement of the frame E to feed the sheet, and then to lift them above and out of contact with said sheet during the backward movement of the said frame E to prevent the sheet being carried back and to allow the sheet to be removed by the printing-press. In the machine shown we have hinged the puller-arms 30 to a cross-bar E' of the reciprocating frame E, as illustrated in Figs. 5 and 13. This hinged connection is such as to allow movement of said arms 30 in a vertical plane parallel with the direction of reciprocation of the frame E. The puller-arms 30 are provided with enlarged friction-surfaced feet $30^a$, similar to the feet of the pushers 21, above described, for the purpose of providing sufficient frictional engagement of the pullers with the sheet to insure its being pulled across the smooth-surfaced feed-board 40 as the pullers move forward—i. e., toward the left in Figs. 2, 3, and 13. A spring 31 is also provided, which being secured to a rigid part, as E', bears down on the free end of the puller-arms and increases the engagement of the pullers with the paper. The puller-arms 30 are, as seen in Figs. 4 and 5, spaced some distance apart, which tends to prevent the sheet engaged by them from being pulled crookedly. Latch-bars 32 are secured to some rigid part of the frame E, as to projections $32^a$ on the cross-bar E'. The latch-bars have hooks on their lower ends, as seen most clearly in Fig. 13, and their upper end extends above their point of support. The hooks on the latch-bars are adapted to be engaged with latch-plates on the puller-arms 30, and thereby suspend the puller-arms 30 with their feet $30^a$ out of contact with the paper.

It will be observed that the puller-arms 30 are projected downward and rearward (see Figs. 2 and 3) in such manner that as the frame E moves forward (to the left) in its reciprocation the sheet engaged by the feet of the pullers will be pulled forward toward the printing-machine P. A stop 33 is fixed near the forward end of the machine in position to be engaged by the lower inclined surfaces of the puller-arms 30 when they reach the position shown in Fig. 2, in which the frame E is near the limit of its forward or feed stroke. As the frame proceeds on to the left to the limit of said forward stroke the puller-arms 30 will ride up on the stops 33 and the feet $30^a$ will be lifted off the sheet which they have pulled forward with them. As the lower ends of the arms 30 are raised the latch-plates $30^b$ are brought into engagement with the latch-bars 32 and the hooks of the bars drop into the apertures of the plate. When the frame E begins its backward reciprocation and the puller-arms 30 are moved away from the stops 33, said arms will be held in their raised position by the latch-bars and latch-plates and the pullers will be carried back to the position shown in Fig. 13, which is adjacent to the pile of paper, with the puller-feet in a plane above, and therefore out of contact with the sheet which they have just brought forward. The stops 33 may conveniently be comprised in a single bar suspended from the frame and extending across the fore part of the machine, as shown.

For the purpose of releasing the puller-arms from the latch-bar when the backward movement is completed and the feet have arrived over the front edge of the sheet which they are next to engage we have located adjustable stops, as 35, (see Figs. 3, 4, 13, and 14,) upon the frame of the machine in a position to meet the upper end of the latch-bars 32 and to turn the same upon their pivots to release the arms 30 just as the backward reciprocation is completed. This allows the arms 30 to drop under the influence of gravity and the springs 31, and the feet $30^a$ are thereby brought down onto the sheet which they are to feed forward. It will be noted that the spring 31 performs an important function in insuring a prompt descent of the puller-feet $30^a$ into engagement with the paper in the very short interval which elapses during the reversal of the direction of movement of the reciprocating frame E in a rapidly-operated machine. This prompt action is desirable in order that the sheet may not be pushed backward by the pullers falling too early or be left behind by the pullers falling after the forward stroke has begun. In order to further facilitate accurate operation, we have found it desirable to secure the stops 35 adjustable on the frame and have used the screw-and-slot connection shown. Other means may of course be employed for lifting the pullers from the fed sheet during their return stroke and for bringing them again into engagement with the partially-separated sheet to be next fed.

Figure 15:
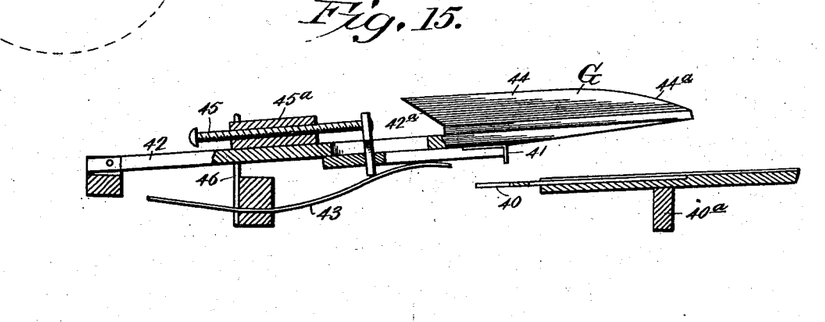
Fig. 15 is a detail view of one of the gages for positioning the paper on the table, showing also the means for adjusting the same.

The gages 41, for engagement with the forward edge of the sheet to accurately position it, are carried by arms 42, pivotally mounted on the frame, as shown in Figs. 3 and 15. These gages occupy a position adjacent that of the pullers when the latter are at the forward limit of their movement, as is apparent in the plan view, Fig. 1. The gages are normally raised above the feed-board 40 into the position shown in Fig. 15 by means of springs 43, mounted on the frame of the machine beneath the gages. The arms 42, which carry the gages, are extended beyond said gages to support upwardly-projecting flanges 44, the rear or right-hand ends of which are formed as inclines $44^a$. Mounted to move with the reciprocating frame E and conveniently carried by the pullers F are lugs, as 39 39. These lugs are so located that their path of travel passes over the gages, and they are arranged to engage the inclines $44^a$ and depress the gages in opposition to the springs 43 and bring them into position to stop the sheet as it is drawn forward by said pullers. Preferably the lugs 39 39, which depress the gages, will be carried by the puller-arms 30, because these are at the completion of the feed movement raised by the stop 33 and held in the elevated position during the backward movement of the pullers. By raising the stops 39 39 from the plane of the inclines $44^a$ $44^a$ the gages are held depressed but a short time and then are allowed to be raised by the springs 43 to open the passage-way between the gages 41 and the feed-board 40, (see Fig. 15,) through which the sheet is to be withdrawn by the printing-machine. Other means may, however, be employed to operate the gages at the proper times. The gages are adjustable on the carrying-arms 42 by means of the screw 45, threaded into a block on the arms 42 and swiveled in a lug $45^a$, which passes loosely through a slot $42^a$ in the arm 42 and is secured to the gages 41. The arms 42 are guided in their movements between the vertical posts 46 46.

Figure 20:
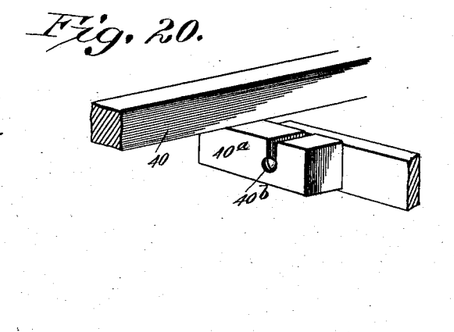
Fig. 20 is a detail showing the means for adjusting the rear end of the table, as shown in Fig. 1.

Provision is made for vertically adjusting the forward end of the feed-board 40. (See Figs. 1 and 20.) The feed-board carries at each side near the forward end a laterally-projecting lug 40$^a$, having therein a vertical slot. A coöperating lug on the frame of the machine is arranged adjacent thereto and is screw-threaded to receive a clamping-screw 40$^b$, arranged in the slot of the lug 40$^a$. By loosening the screw 40$^b$ the feed-board 40 may be adjusted as found desirable.

We have provided means for intermittently raising the supply table or magazine 50, whereby the surface of the pile of paper on said table may be kept at an approximately uniform height. It has been found by experience that with paper of usual thickness the level of the pile may vary by the thickness of several sheets, few or many, according to the thickness of the individual sheets, without impairing the efficiency of the separating devices. It therefore is not necessary that the magazine shall be raised after every feed movement; but in order that the magazine may be elevated whenever the level has reached the lowest height consistent with perfect efficiency without regard to the number of feed movements which may have taken place in reducing the level of the paper to such height and that this may be done automatically we have devised the mechanism herein shown and now to be described. It is to be noted that this mechanism is in many respects applicable to use in the automatic adjustment of receptacles from which any form of sheet-like articles are being removed or to which such articles are being supplied.

Figure 17:
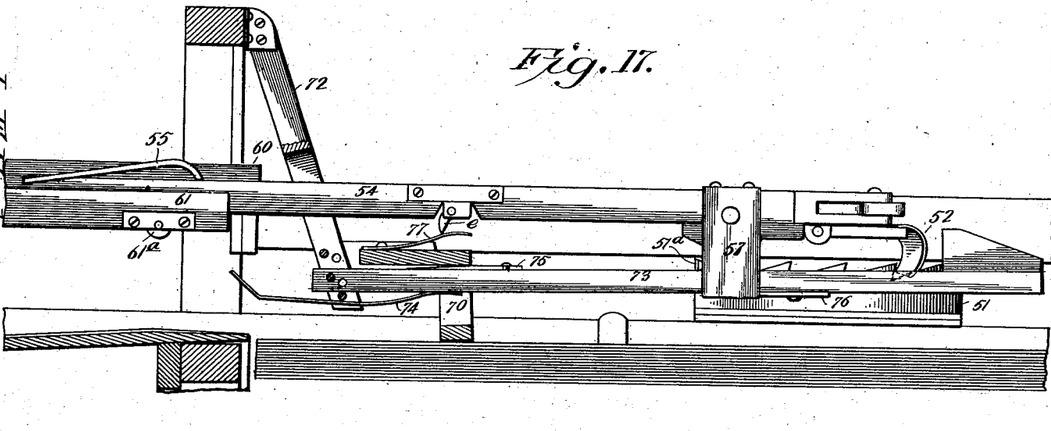
Fig. 17 is a side elevation of the mechanism for lifting the magazine which carries the pile of paper to be separated and fed, certain of the parts being shown in sections.
Figure 18:
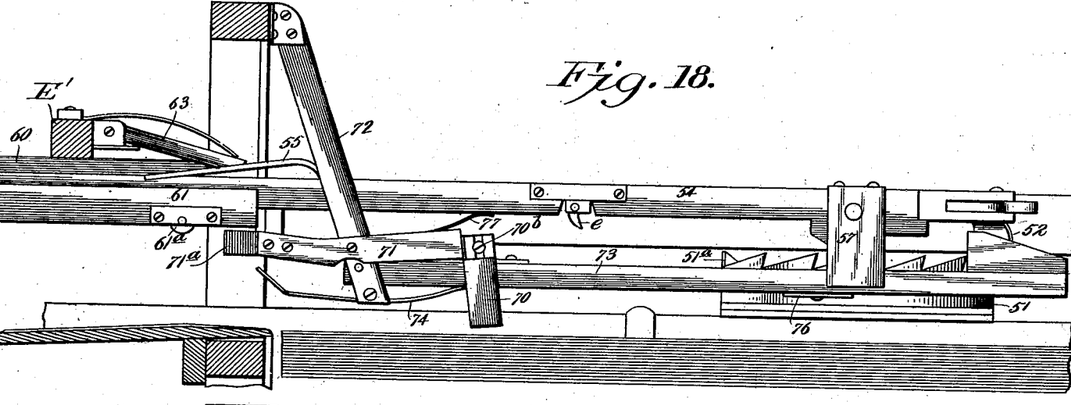
Fig. 18 is a view similar to Fig. 17, showing the parts in a different position.
Figure 19:
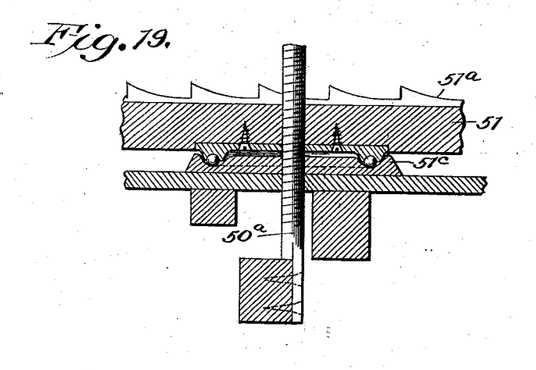
Fig. 19 is a detail showing the engagement of the screw-threaded hanger which supports the magazine with the ratchet-wheel.

The feed table or magazine 50 is mounted, as shown in Figs. 1, 3, 4, 16, and 19, upon posts 50$^a$, which project upward and which are screw-threaded to engage with nuts 51, mounted on ball-bearings 51$^c$ in the frame of the machine. The magazine 50 is provided with laterally-projecting guide-lugs 50$^b$, which are received in guideways in the machine-frame, as shown in said figures, to steady the magazine. The nuts 51 are provided with peripheral flanges 51$^a$, the upper edges of which are notched to form ratchet-teeth for coöperation with a suitable pawl, as 52, whereby the nut may be operated to raise the magazine-supporting posts. As shown, there are two of the supporting-posts 50$^a$, one upon each side of the machine, and two sets of mechanisms acting automatically to turn the two nuts to raise the magazine. These two sets of mechanisms are alike in all particulars, and therefore a description of one only will be necessary. The one on the left-hand side of the machine is the one shown in perspective in Fig. 16. In Figs. 17 and 18 the mechanism is seen from the side opposite to that seen in Fig. 16.

The frame of the machine comprises longitudinally-extending bars 60, which form tracks for rollers on the ends of the cross-bar E' of the reciprocating frame E. On one side of the bars 60 are constructed guide-channels 61. Antifriction-rollers 61$^a$ are provided in these guide-channels. Bars 54 are arranged in the guide-channels 61 and provided with inclined friction-surfaces 55, (see Fig. 18,) which are adapted to be engaged by dog 63 on the cross-bar E' of the reciprocating frame E, whereby the bar 54 will partake to a certain extent of the reciprocations of said frame E. The dogs 63 are pivotally mounted on the bar E' and held yieldingly in contact with the bar 54 by spring 63$^a$, whereby the dog may slide on the stop 55 whenever the bar 54 encounters resistance sufficient to overcome the friction between said stop and dog.

A link 53 is pivoted at one end to the machine-frame adjacent the nut 51 and at its other end is attached to the bar 54 by a stud-and-slot connection, whereby the bar 54 causes an oscillation of link 53 about its pivotal connection with the frame. A pawl 52 is attached to the link 53 and is thereby reciprocated. When the bar 54 is carried by the reciprocating frame E to the limit of the rearward stroke of said frame, the reciprocation given to the pawl 52 is ample to cause it to engage a new tooth of the ratchet 51$^a$. Upon the forward stroke of the frame E it strikes a shoulder 80 on the rear end of bar 54, by which means said bar 54 is drawn forward, and the nut 51 will be turned by the pawl and the magazine thereby raised.

We have provided in conjunction with each of the reciprocating bars 54 a device for testing the level of the paper on the magazine and means operated by such testing device whereby, so long as the level of the paper remains high enough for the efficient operation of the separating mechanism, an obstacle will be presented to the full rearward stroke of the bar 54. In this way the reciprocation of the pawl on the ratchet-tooth is shortened, and the pawl fails to go back far enough to engage a new tooth. Consequently upon the forward stroke the pawl, not having engaged a new tooth, slides on the tooth last engaged. The object of the mechanism having been stated, its operation will be understood from the following description of its construction.

Figure 16:
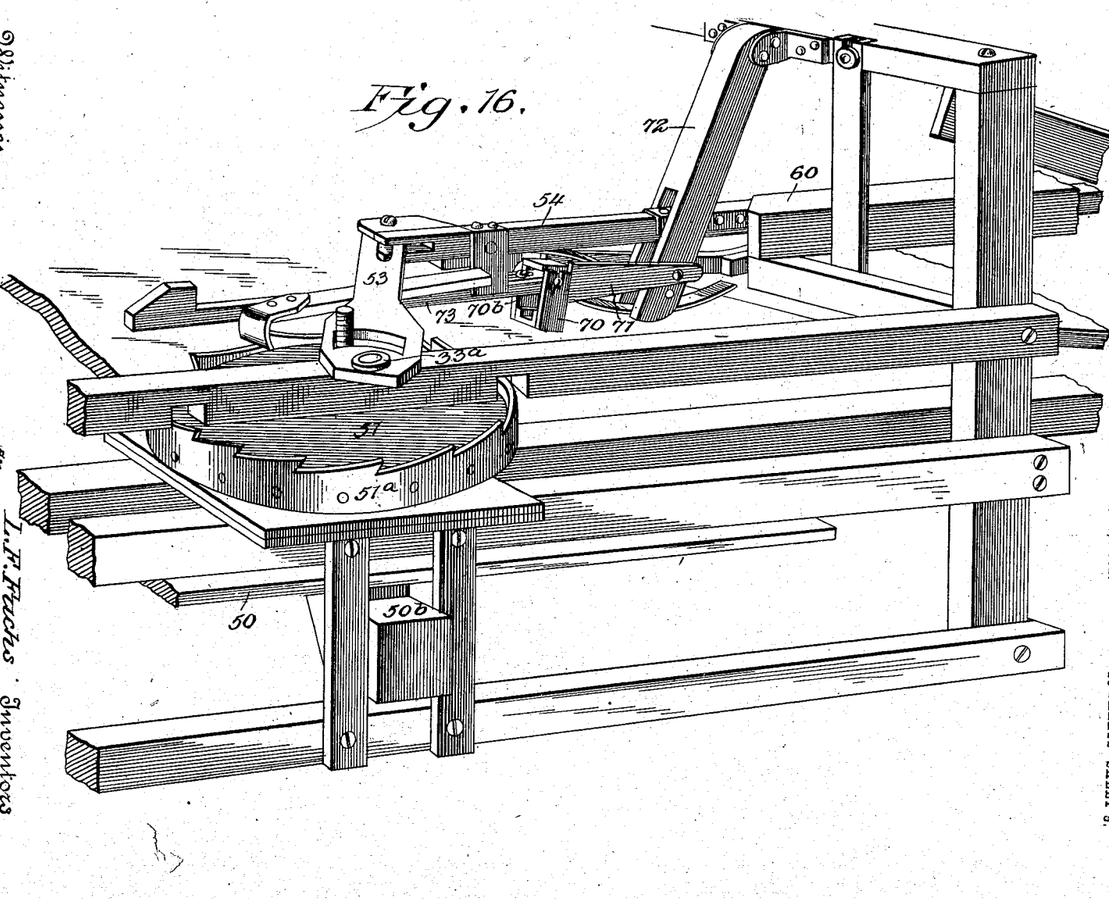
Fig. 16 is a perspective view of one of the mechanisms located upon opposite sides of the machine for intermittently raising the bed which carries the pile of paper, whereby the top of the pile is kept at an approximately constant level.

A pair of arms 71 are pivoted at one end to the hangers 72, as is shown in Figs. 16 and 18. The free ends of these arms carry a frame 70, which is the device which tests the level of the pile of paper on the magazine. This device we will, for convenience, designate as a "tester." The tester 70 is made with a horizontal aperture therethrough, which receives a bar 73. This bar 73 is also freely pivoted to the hanger 72 and is extended beyond the tester to a point opposite the ratchet. A spring 74, secured to the hanger, normally supports the free end of the bar 73, so that it maintains a substantially horizontal position and holds the tester 70, through which it passes, up off the paper in the magazine below. An adjustable wedge 75 is secured to the upper side of the bar 73 between it and the tester to vary the relative height of the tester and bar. The bar 73 is also provided, preferably at its lower surface, with a stop 76. This stop may well be constructed, as shown, to present an inclined or wedge surface or surfaces 76ª 76ª, as seen in Fig. 1. The tester 70 is provided on its upper side with a preferably yielding contact-surface 77 for engagement with a cam shoulder or dog e on the reciprocated bar 54. The bar 54 also carries a stop or projection 57 for engagement with the stop 76 on the bar 73. Preferably the projections 57 are provided in pairs to correspond with the pair of wedge-surfaces 76ª 76ª and to also serve to guide the bar 54 in alinement with bar 73. As the bar 54 makes its rearward stroke, impelled by the frame E through the frictional contact of dog 63 with cam-surface 55, the cam e engages the contact-surface 77 on the tester 70 and presses the tester against the top surface of the pile of paper in the magazine, as shown in Fig. 17. The bar 73 is also depressed with the tester through which it extends. The projection 57 on the bar 54 is so located as to arrive opposite the stop 76 on the bar 73 during the period of depression of the tester by the cam 56. If the level of the paper in the magazine is low enough so that the tester is depressed sufficiently, the bar 73 being carried with it carries the stop 76 below the path of the projection 57, and as the bar 54 continues to move the said projections are carried over the stop 76, and the bar 54 continues to move to the limit of the rearward stroke of frame E; but if the paper is still at a working level the depression of the tester 70 against the top of the pile does not carry the stop 76 below the plane of the projections 57, and said projections engage with said stops 76, and sufficient resistance is thereby interposed to overcome the frictional engagement of the dogs 63 with the shoulders 55 on the bars 54, and said dogs slide over said shoulders as the bar 54 comes to rest. This premature ending of the stroke of the bar 54 prevents the pawl 52 from being carried back far enough to engage a new tooth of the ratchet, and so it slides idly over the ratchet and the magazine remains at rest. As the frame E makes its forward stroke, the bar E' slides idly back over the bars 54 until it engages the shoulders 80 on the forward portions thereof. After the bar E' encounters these shoulders 80 the bars 54 are caused to travel with the frame E and to pull forward the pawls 52. If these pawls have engaged teeth on the ratchet, the nut is turned and the magazine is raised; but if the pawls have not engaged teeth of the ratchet they slide forward idly, as before stated.

The operation of the machine will be understood from the above description of the mechanism; but that it may as a whole be better comprehended it will be reviewed. The magazine having been charged with a supply of sheets, as indicated in Figs. 2 and 3, and having been adjusted to a proper height, the actuating-frame E is reciprocated by suitable means from a source of power. Starting from the position of the several parts shown in Fig. 2, the separating-needle resting upon the top sheet, the frame E travels toward the right. The first action is the engagement of the cams a a with the levers 12 and the momentary raising of the detainers from contact with the top sheet. Practically simultaneously with the raising of the detainers the pushers are depressed by the cam c and caused to push the sheet forward. This movement takes the sheet from under the detainers and they, by reason of the form of the cams a a, immediately drop into contact with the next sheet and detain that from any tendency to adhere to and move away with the top sheet. This primary movement of the top sheet by the pushers also causes said sheet to become impaled upon the sharp point of the separating-needle, and as such movement proceeds the sheet rides up on the shank of the needle. This upward movement of the sheet raises its end portion off the next sheet or off from the magazine, whatever may be its support, and thereby lessens the friction ensuing when the sheet is further withdrawn. The cam b is so located as to engage the lever 18 and raise the needle-block as soon as the sheet has been drawn well up onto the shank of the needle by the pushers under the influence of the cam c. As the needle-block is raised the needle is enabled to turn upon its pivotal connection with the needle-block and support the edge of the sheet engaged on its shank as the withdrawal of the sheet by the pushers under the influence of cam d continues and until the needle is turned forward and the sheet is stripped off from it. The pullers are released from the hooks 32 and dropped to engage the sheet as soon as the pushers have reached the limit of their movement, and said pullers at once begin their forward movement, so that the withdrawal of the sheet by the pushers and the pullers may be a practically continuous operation. The movement imparted to the sheet by the pushers, however, is relatively slower than that imparted to it by the pullers. This is desirable in order to enable the sheet to more surely become impaled on the needle. The pullers draw the sheet the length of the feed-board 40 and against the edges of the gages 41. After the edge of the sheet strikes the gages the pullers may be arranged to have a slight further movement, in which they slide over the surface of the sheet in order to surely position the edge of the sheet against both gages and in alinement therewith before the stop 33 operates to raise the pullers from engagement with the sheet. The sheet having been thus separated from the pile and fed into position to be engaged by the printing-press P, the pullers are raised and engaged by the hooks 32, and the reciprocating frame E then reverses and begins its return movement, whereupon the operation is repeated to feed other sheets. The frame E on its return stroke engages the bars 54 by means of the dogs 63 and cams 55 and pushes said bars back, depressing the testers 70 against the top of the pile of paper in the magazine. If the pile is reduced below an efficient level, the plates 57 are carried over the inclined stops 76 76 out of contact therewith, and the bars 54 are carried back far enough to cause their pawls to engage new teeth on the ratchets. When the frame makes its next forward stroke, it strikes the heels 80 on the bars 54 and draws said bars back and through the pawls turns the ratchets to raise the magazine. If the paper on the magazine is still up to an efficient height, the testers do not allow the bar 73, carrying the stops 76, to be depressed sufficiently far to bring the said stops below the path of the coöperating plates 57 on the bars 54, and said plates when they strike the stops 76 arrest the movement of the bars 54 before the pawls have been carried back sufficiently far to engage a tooth of the ratchet. When the bars 54 are again pulled forward on the forward stroke of the frame E, the pawls will slide idly on the tooth of the ratchet without moving the same. It is to be noted that as the sheet is given its primary movement by the pushers the needle is held thereagainst by its own weight and a component of the weight of the needle-block. Normally the sheet will be at once impaled on the needle, which will then bear upon the sheet next below and assist in holding that from movement with the top sheet, the needle remaining substantially stationary at this time. If, however, the needle encounters a hard spot in the paper, such as sometimes is found, or if for any reason it does not at once pass through the sheet, it sticks therein and its point is carried forward with the moving sheet. This results in bringing an increasing portion of the weight of the needle-block to bear upon the needle. If the movement of the needle is continued for an appreciable distance, it must thereafter actually raise the needle-block. Also, as the point of the needle is carried forward the angle which the needle makes with the paper increases, and this causes it to become more and more effective in piercing the sheet.

We have herein described a mechanism in which the several features of our invention are embodied. This invention is, however, in many respects generic and independent of any particular form of mechanism, and we do not mean to be understood as limiting ourselves to the form of mechanism shown and described.

What we claim, and desire to secure by Letters Patent, is—

1. In a sheet-separating machine, the combination of sheet-separating devices with a detainer adapted to engage the pile of paper and means to raise the detainer during the withdrawal of the top sheet from the pile and to return it to engagement with the pile immediately thereafter, said separating devices being constructed to retain the second sheet in place while the detainer is raised, whereby said second sheet is at all times held against displacement.

2. In a sheet-separating machine, the combination of sheet-separating devices with a sheet-detainer and means to withdraw the detainer during the initial operation of the separating devices and to return the same into engagement with the pile during the subsequent operation of said separating devices, said separating devices being constructed to retain the second sheet in place while the detainer is raised, whereby said second sheet is at all times held against displacement.

3. In a sheet-separating machine, a sheet-detainer arranged for movement into and out of engagement with the paper, a cam and intermediate connections comprising bell-crank levers arranged to be engaged by said cam and links constituting flexible connections between said levers and the detainer to actuate the same.

4. In a sheet-separating machine, in combination, a sheet-detainer, a sheet-separating mechanism, and means to successively operate said devices, said devices operating to at all times positively hold the second sheet from displacement.

5. In a sheet-separating machine, the combination of a sheet-separating mechanism and a sheet-detaining device and means to cause said devices to alternately and successively engage the sheets of paper to remove them one by one, said devices operating to at all times positively hold the second sheet from displacement.

6. In a sheet-separating machine means to raise one edge of the top sheet, said means acting to positively hold the second sheet from displacement during the raising of the top sheet, a detainer and a connected mechanism to disengage said detainer from the pile during the raising of the edge of said sheet, and to cause said detainer to engage the second sheet during the withdrawal of the top sheet.

7. In a sheet-separating machine, sheet-separating devices, and sheet-detaining devices, and means to operate said devices to cause them to successively and alternately engage each sheet of a pile of paper to remove the top sheet and to at all times positively hold the second sheet from movement with the top sheet.

8. In a sheet-separating machine, a sheet-separating device, a sheet-detaining device and connected mechanism to cause said devices to successively and alternately, but not simultaneously, act upon each of the several sheets of a pile of paper to remove the top sheet and to at all times positively hold the second sheet from movement with the top sheet.

9. In a sheet-separating machine, a sheet-separating mechanism and a sheet-detaining mechanism and connected means to cause the detaining mechanism to release the top sheet substantially simultaneously with the operative engagement of the separating mechanism therewith, said means operating to remove the top sheet and to at all times positively hold the second sheet from movement with the top sheet.

10. In a sheet-separating machine, a sheet-separating needle, a support on which said needle is pivotally mounted, and means to reciprocate said support in a vertical plane, whereby said needle is permitted to turn about its pivot.

11. In a sheet-separating machine, a separating-needle arranged to engage a sheet, a support upon which said needle is mounted for oscillation, means to withdraw the sheet, means to raise said support whereby the said needle is permitted to oscillate to support the sheet as it is withdrawn, and means to return said needle and said support successively to their normal positions.

12. In a sheet-separating machine, a separating-needle arranged to engage a sheet and means coacting therewith to withdraw the sheet, a support upon which said needle is mounted to oscillate, means to raise said support, whereby the said needle is permitted to swing to carry the sheet engaged thereon, as it is withdrawn, and means to return said needle to its normal position.

13. In a sheet-separating machine, a needle arranged to rest at its point upon the sheet to be fed, means to give said sheet a relatively slow movement to cause it to become impaled on the needle and a more rapid movement to complete the separation.

14. In a sheet separating and feeding machine, a needle arranged to rest at its point upon the sheet, means to give the sheet a relatively slow movement to cause it to become impaled on the needle and partially separated from its support, and means to give said sheet a relatively rapid movement to complete the separation and feed the sheet.

15. In a sheet-separating machine, a needle arranged to make engagement with, but not to puncture, the top sheet, a support about which said needle is pivoted, means to move said sheet to cause it to become impaled on said needle, means to raise said support, whereby the needle may swing on its pivot to carry the portion of the sheet engaged therewith out of engagement with the pile as said sheet continues to be moved backward by the before-mentioned means.

16. In a sheet-separating machine, a table to support the sheets, a separating-needle, a holder for said needle, a support for said holder with relation to which said holder is free to oscillate, said holder comprising a counterbalance for said needle to cause said needle to assume a normal position inclined to the plane of the sheets, and to return said needle to such position when displaced therefrom.

17. In a sheet-separating machine, a table to carry the stock, a movable support, a needle-holder pivotally mounted therein, a needle carried thereby so arranged as to assume an inclined relation to the top sheet of the stock and to contact therewith, means to move said top sheet to cause it to become impaled on said needle and to swing the same with relation to the support as the latter is moved, and means to return the needle to its normal position upon being disconnected from the said sheet.

18. In a sheet-separating machine, a pivotally-mounted separating-needle, arranged to engage a sheet, primary sheet-withdrawing means to cause said sheet to impale itself on said needle, whereby a portion of the sheet is separated from its support, in combination with secondary sheet-withdrawing means operating to turn said needle on its support, whereby the portion of the sheet engaged by the needle is held out of frictional contact with its support during such movement of withdrawal.

19. In a sheet-separating machine, a pivotally-mounted separating-needle, arranged to engage a sheet, primary sheet-withdrawing means to cause said sheet to impale itself on said needle whereby a portion of the sheet is separated from its support, in combination with secondary sheet-withdrawing means operating to turn said needle on its support, whereby the portion of the sheet engaged by the needle is held out of frictional contact with its support during such movement of withdrawal, and means to return said needle to its original position after the detachment of the sheet therefrom.

20. In a sheet-separating machine, a separating-needle so mounted as to be capable of movement in the arc of a circle and arranged to rest upon the sheet, means to move the sheet to tend to cause it to become impaled on the needle and to cause the needle in its movement to bear with greater force upon the sheet.

21. In a sheet-separating machine, a separating-needle pivotally mounted and arranged to rest upon the sheet, means to move said sheet to change its position relative to the needle and to tend to cause said needle to turn upon its pivot, whereby the needle will bear with increasing force upon the sheet until the sheet shall have become impaled upon the needle.

22. In a sheet-separating machine, a separating-needle yieldingly mounted, and arranged to rest at its point upon the sheet, means to move the sheet to tend to cause it to become impaled on the needle and to cause the said needle to move yieldingly with the sheet until the sheet has become impaled thereon.

23. In a sheet-separating machine, a separating-needle, means to move the sheet in its plane, the needle being so arranged that its point may move with the sheet in the plane of the sheet until the sheet has become impaled thereon.

24. In a sheet-separating machine, a separating-needle yieldingly mounted, and arranged to rest at its point upon the sheet, means to move the sheet to tend to cause it to become impaled on the needle and to cause the said needle to move yieldingly with the sheet until the sheet has become impaled thereon and thereafter shall contact with the underlying sheet to hold the same from movement with the said top sheet.

25. In a sheet-separating machine, a separating-needle arranged at an angle to the plane of the sheet and to rest at its point thereon, means to move the sheet to tend to cause it to become impaled on the needle and to move the needle to vary the angle of contact with the sheet until the latter has become impaled thereon.

26. In a sheet-separating machine, a separating-needle adapted to rest at its point on the sheet, means to move said sheet relative to the needle to impale it thereon, said needle arranged at an initial angle to the sheet and to have its point move with the sheet to increase such angle until the sheet has become impaled thereupon and thereafter to temporarily cease to move with the sheet.

27. In a sheet-separating machine, a separating-needle movably mounted and arranged to rest at its point upon the sheet, means to move the sheet to tend to cause the same to become impaled on the needle and to cause the point of the needle to move with the sheet in its plane until the sheet has become so impaled, and to thereupon hold the underlying sheet from movement with the upper sheet.

28. In a sheet-separating machine, a pivoted separating-needle arranged to contact with the sheet, means to move the sheet to cause it to become impaled on the needle and to raise one edge thereof from its support, combined with means to complete the withdrawal of the sheet from its support to feed the same, said needle operating to support the edge of the sheet engaged thereby out of contact with its support during a portion of such movement in the direction of the feed.

29. In a sheet-separating machine, a pusher comprising a bent lever, a hinge flexibly connecting the arms of said lever, a spring normally holding said lever flexed and means acting to tend to straighten said lever to cause it to move the sheet.

30. In a sheet-separating machine, a bent lever, a fixed support for one end of said lever, a hinge connecting the two arms of said lever, a spring to maintain the lever normally flexed and means to tend to straighten said lever and operating to bring the free end thereof first into a position of firm contact with the sheet and second to displace the sheet.

31. In a sheet separating and feeding machine, a needle-support, a separating-needle movably mounted therein and arranged to contact with a sheet near one edge thereof, in combination with means to move said sheet to cause the edge portion adjacent the needle to become impaled on the said needle and raised above its support and to cause the sheet to be bodily displaced in the direction of feed.

32. In a sheet separating and feeding machine, a needle to contact with the sheet to be separated, a pusher coöperating with said needle to give said sheet its initial movement of separation—said needle and pusher engaging said sheet on its median line and a pair of pullers arranged to engage said sheet upon opposite sides of its median line to complete the separation and feed the sheet.

33. In a sheet separating and feeding machine, a needle arranged to contact with the sheet to be separated, a pusher coöperating with the needle to give said sheet an initial movement of separation, a puller to thereafter engage the sheet to complete the separation of the sheet and to feed the same.

34. In a sheet separating and feeding machine, a needle arranged to contact with the sheet to be separated, a pusher coöperating with the needle to give said sheet an initial movement of separation, a puller to thereafter engage the sheet to complete the separation of and to feed the same, in combination with gages to position the sheet as it is fed.

35. In a sheet separating and feeding machine, a needle arranged to contact with the sheet to be separated, a pusher coöperating with the needle to give said sheet an initial movement of separation, a puller to thereafter engage the sheet to complete the separation of the sheet and to feed the same, in combination with gages to position said sheet, said gages being normally out of the path of said sheet and means operated by the pushers to cause said gages to assume an operative position during the last portion of the feed movement.

36. In a machine for feeding sheet material, sheet-feeding devices, gages for positioning the sheets at the end of the feed movements, means controlled by the feeding devices for normally maintaining said gages out of the path of the sheet and for interposing them across said path to position the sheet.

37. In a sheet-feeding machine, sheet-feeding devices, gages for positioning the sheet, means to normally hold the gages out of the path of the sheet, means operating automatically to place said gages across the path of the sheet just prior to the arrival of the sheet in position to be engaged thereby.

38. In a sheet-feeding machine, sheet-feeding mechanism, gage devices coöperating therewith to position the sheets means to normally maintain said gage devices above the plane of the sheet being fed means carried by the feeding mechanism to engage said gage devices and force the gages into the path of said sheet during the passage of the feeding mechanism thereover.

39. In a sheet-feeding machine, a plurality of sheet-feeding devices, a plurality of pivoted stops or gages coöperating therewith to position the sheets, means to maintain said gages normally in inoperative position, said gages provided with contact-surfaces inclined to the plane of movement of the feeding devices and means carried by said feeding devices to engage said contact-surfaces to force the gages into operative position, as the sheet is fed thereagainst.

40. In a sheet-feeding machine, a gage to position the sheets, mechanism to feed the sheets thereagainst, means normally maintaining said gages in inoperative position, means carried by the feeding devices to coöperate with said gages to bring the latter into operative position as the sheet is fed thereagainst.

41. In a sheet-feeding machine, means for positioning the sheets as they are fed comprising pivoted arms, gages carried thereby, means for adjusting said gages upon said arms, means for yieldingly supporting said arms whereby said gages may be moved into and out of the path of the sheets.

42. In a sheet separating and feeding machine, a reciprocating frame movable in suitable guideways sheet-feeding devices carried by said reciprocating frame, sheet-separating mechanism and a series of cams carried by said reciprocating frame to successively engage and actuate the several parts of the separating mechanism.

43. In a mechanism for the purpose specified, a needle arranged to contact with the topmost sheet of a pile of paper; means to move said topmost sheet in a direction oblique to the needle, whereby the sheet is impaled on the needle, and separated from the next sheet, and means to remove the sheet from the needle without tearing the same.

44. In a mechanism of the character described, a reciprocating carrier, a needle mounted thereon to contact the topmost sheet of the pile of paper, and means to move the said sheet to cause the needle to puncture it, whereby the sheet may be removed from the pile by the needle.

In testimony whereof we affix our signatures in presence of two witnesses.

LOUIS F. FUCHS.
BENJ. K. FISHER.

Witnesses:
C. E. CHAFFEE,
EDWIN W. LEE.